(12) United States Patent
Patrich et al.

(10) Patent No.: US 12,124,572 B2
(45) Date of Patent: Oct. 22, 2024

(54) ANOMALOUS ACTIVITY DETECTION IN CONTAINER IMAGES

(71) Applicant: Microsoft Technology Licensing, LLC, Redmond, WA (US)

(72) Inventors: Dotan Patrich, Kfar Saba (IL); Josef Weizman, Haifa (IL); Tomer Koren, Tel Aviv (IL); Eran Goldstein, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 272 days.

(21) Appl. No.: 17/716,741

(22) Filed: Apr. 8, 2022

(65) Prior Publication Data

US 2023/0325500 A1 Oct. 12, 2023

(51) Int. Cl.
| | | |
|---|---|---|
| *G06F 21/00* | (2013.01) | |
| *G06F 8/71* | (2018.01) | |
| *G06F 21/55* | (2013.01) | |
| *G06F 21/56* | (2013.01) | |

(52) U.S. Cl.
CPC .............. *G06F 21/554* (2013.01); *G06F 8/71* (2013.01); *G06F 21/564* (2013.01); *G06F 21/565* (2013.01)

(58) Field of Classification Search
None
See application file for complete search history.

(56) References Cited

U.S. PATENT DOCUMENTS

| | | | | |
|---|---|---|---|---|
| 8,069,210 B2* | 11/2011 | Gillum | ................... | H04L 51/212 |
| | | | | 709/224 |
| 8,418,249 B1* | 4/2013 | Nucci | ................... | G06F 21/552 |
| | | | | 709/225 |
| 8,887,286 B2* | 11/2014 | Dupont | ................... | G06F 21/50 |
| | | | | 726/25 |
| 9,794,287 B1* | 10/2017 | Koster | ................... | G06F 21/552 |
| 10,599,833 B2 | 3/2020 | Levin et al. | | |

(Continued)

OTHER PUBLICATIONS

"International Search Report and Written Opinion Issued in PCT Application No. PCT/US2023/015246", Mailed Date: Jun. 22, 2023, 9 Pages.

*Primary Examiner* — Maung T Lwin

(74) *Attorney, Agent, or Firm* — Mannava & Kang, P.C.

(57) ABSTRACT

According to examples, an apparatus may include a processor and a memory on which is stored machine-readable instructions that may cause the processor to identify a container image group of a plurality of container image groups to which a subject container image corresponds, in which each of the plurality of container image groups is assigned a respective behavioral profile. The processor may also determine whether activities in the subject container image comply with corresponding activities identified in the behavioral profile of the identified container image group. Based on a determination that at least one activity in the subject container image fails to comply with a corresponding at least one activity identified in the behavioral profile of the identified container image group, the processor may determine that the subject container image includes an anomalous activity and output an alert indicating that the subject container image includes an anomalous activity.

20 Claims, 7 Drawing Sheets

(56) References Cited

U.S. PATENT DOCUMENTS

| | | |
|---|---|---|
| 10,824,726 B1 | 11/2020 | Herman Saffar et al. |
| 10,936,717 B1* | 3/2021 | Herman Saffar ... G06F 9/45558 |
| 11,188,644 B2 | 11/2021 | Turbin et al. |
| 11,265,346 B2* | 3/2022 | Xiao .................... H04L 63/0281 |
| 11,748,473 B2* | 9/2023 | Araujo .................. G06F 21/566 |
| | | 726/23 |
| 2016/0065594 A1* | 3/2016 | Srivastava .......... H04L 63/1433 |
| | | 726/23 |
| 2017/0063890 A1* | 3/2017 | Muddu ............... H04L 63/1441 |
| 2020/0233961 A1* | 7/2020 | Wolfin ................ G06F 11/3495 |
| 2020/0279044 A1* | 9/2020 | Lum ........................ G06F 8/65 |

* cited by examiner

ANOMALOUS ACTIVITY DETECTION IN CONTAINER IMAGES

BACKGROUND

A container image may be defined as a lightweight, standalone, executable package of software that may include code, metadata, runtime, system tools, system libraries, and settings needed to run an application, e.g., in a software container. In many instances, container images are unchangeable, static files that include executable code such that the container images may be run as an isolated process on an infrastructure. Container images become containers (or software containers) at runtime and may be the same regardless of the underlying infrastructure upon which the containers are executed. In addition, unlike virtual machines, containers do not require or include a separate operating system. Instead, containers rely on the functionality of kernels and use hardware resources (CPU, memory, I/O, network, etc.) and separate namespaces to isolate the applications' views of the operating systems.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
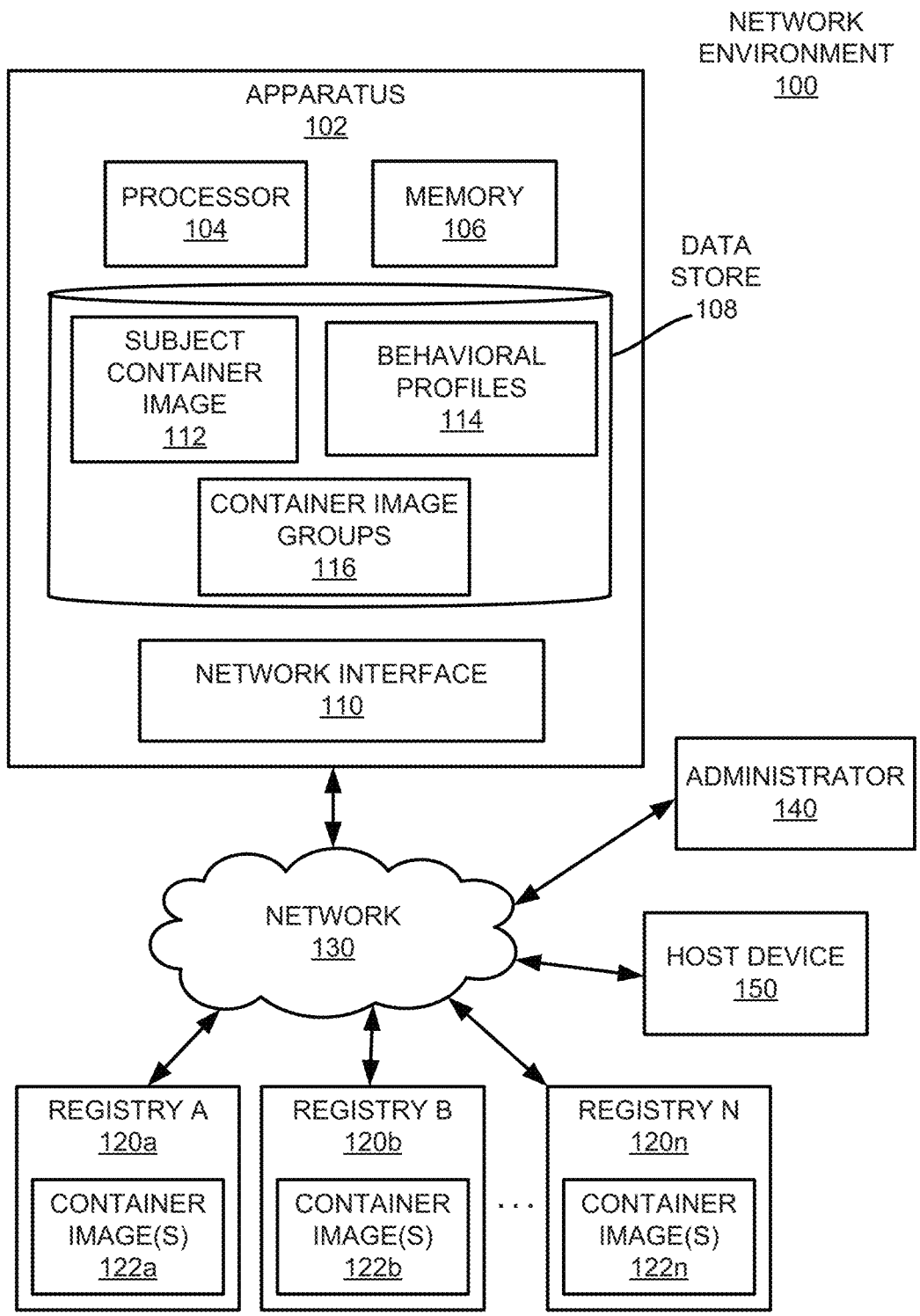
FIG. 1 shows a block diagram of a network environment, in which an apparatus may determine whether a subject container image includes an anomalous activity, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together hi various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Containers (e.g., software containers) are rapidly becoming a mainstream technology due to, for instance, the ease with which the containers may be integrated with cloud-computing platforms as well as the flexibility the containers afford. Service providers may provide operating systems on the cloud-computing platforms to run client services and applications. Programmers may develop and upload container images in image registries. In some instances, malicious users may take advantage of the container images by programming the container images to include malicious code. In these instances, the container images may be vulnerable to malicious attacks when they are integrated in a container. The malicious code may include any type of malware including, for example, computer viruses, spyware, ransomware, worms, adware, Trojan horses, and/or the like. Further, the malicious code may be a source for an advanced persistent threat (APT) attack or a distributed denial of service (DDoS) attack when a container is executed with an infected or malicious container image.

In order to reduce the risk of malicious activity associated with the use of container images stored in registries, security processes may be performed prior to the container images being uploaded into a registry. However, such security processes may be limited in the types of vulnerabilities that they are able to identify. A container image uploaded to a registry may also later be modified by a malicious actor to include malicious code. In addition, a container, and, thus, each application executing in a container, may separately be secured from applications executing in other containers during runtime of the applications. In other words, one container cannot access resources of other containers. In some instances, however, the isolation of the containers may not prevent the execution of malicious code on the containers. For instance, malicious activity by software containers may occur through exploitation of legitimate programs or services in a container and improper configuration.

Existing security techniques may include the building of container profiles for a specific container image tag (e.g., a specific container image version) or container repository (multiple versions from the same registry/source), or by manually learning the behavior profile for a container. For instance, a profile, e.g., a behavioral profile, for each new or newly seen container image may be built. The behaviors of activities indicated in the profile of the container image may be compared with the behaviors of activities indicated in a known profile of similar container images to determine whether there is anomalous behavior in the container image In many instances, programmers may upload the container images into different registries of customers and thus, the same container images may have different names. As a result, behavioral profiles for the same container images may redundantly be learned because the container images have different names.

A technical issue associated with these types of existing security techniques may be that the building of the profiles for the new or newly seen container images may be resource and time-intensive. That is, a processor may consume both processing and energy resources to build the profiles, which may be exacerbated when there are a relatively large number of new or newly seen container images. For instance, a processor may consume a relatively large amount processing and energy resources to execute the applications of the container image in a container to build the profiles as the building of the profiles may include the execution and analysis of the applications in the container image.

Disclosed herein are apparatuses, methods, and computer-readable media for determining whether a subject container image includes an anomalous activity. The subject container image may be a new or newly seen container image, ago a container image for which a processor has not previously determined a behavior profile. As discussed herein, a processor may determine whether the subject container image includes an anomalous activity based on an analysis of the activities in the subject container image with respect to the activities identified in a behavioral profile of a container image group to which the subject container image corresponds. In this regard, instead of building a behavior profile of the subject container image and/or analyzing the activities associated with the subject container image, the behavior profile of the subject container image may be inferred. That is, the subject container image may be deemed as having the same behavior profile as the behavior profile of the container image group to which the subject container image corresponds. The processor may infer the behavior profile of the subject container image because similar container images often run predictable runtime workloads.

According to examples, the processor may determine the container image groups through implementation of any suitable clustering algorithm, for instance, a graphical representation of the relationships between the container Images, Particularly, the processor may cluster the container images based on similarities in the addresses, identifiers, hashes, tags, versions, and/or the like, among the container images. In addition, or alternatively, the processor may cluster the container images based on contexts, configurations, and/or the like, of the container images. The processor may also determine the behavioral profiles of the container image groups based on, for instance, the behavioral profiles of less than all of the container images in the container image groups. The processor may further assign the container image groups with the behavioral profiles determined for the respective container image groups. As discussed herein, the behavioral profiles may define normal behaviors of the applications in the container images during runtime. In addition, or alternatively, the behavioral profiles may define permissible behaviors of the applications during runtime.

Through implementation of the features of the present disclosure, a processor may determine whether a subject container image includes an anomalous activity. The processor may make this determination by inferring a behavioral profile for the subject container image and by determining whether the activities in the subject container image fail to comply with the inferred behavioral profile. As the processor may infer the behavioral profile for the subject container image, the processor may make the determination as to whether the subject container image includes an anomalous activity without performing other actions to determine whether the subject container image includes an anomalous activity. The other actions may include, for instance, running the subject container image and determining whether the applications in the subject container image actually perform anomalous activities during runtime. As a result, the other actions may be relatively time consuming and may consume computing and energy resources to be performed.

A technical improvement afforded through implementation of the features of the present disclosure may thus be that the anomalous activities in subject container images may be determined while reducing or minimizing computing and energy resource consumption. Another technical improvement afforded through implementation of the features of the present disclosure may be that anomalous activities may be detected in a relatively quicker manner, which may result in the earlier detection of malicious activity. By detecting malicious activity earlier, the potential harm caused by the malicious activity may significantly be reduced. These and additional technical improvements are discussed in the present disclosure.

Figure 2:
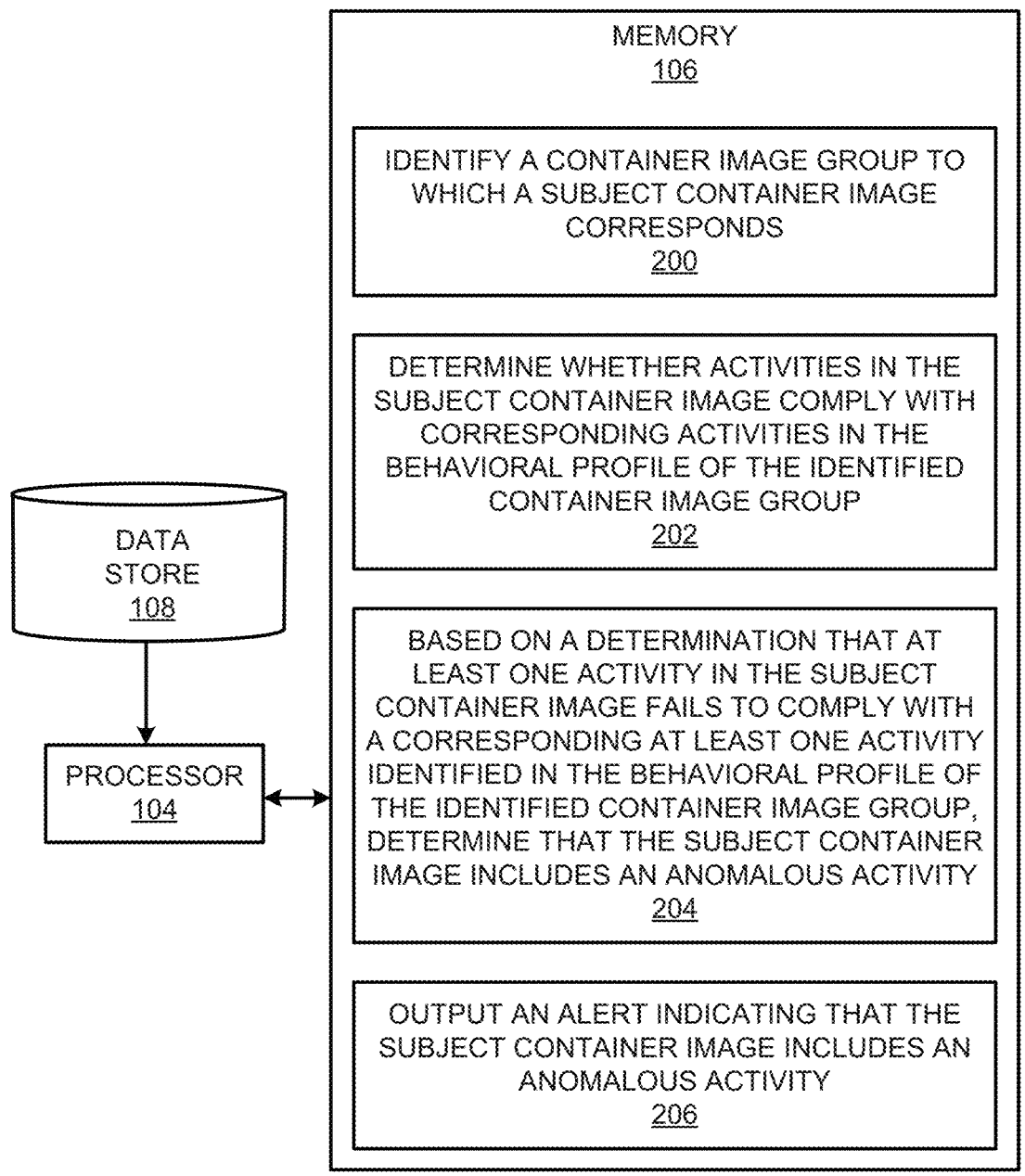
FIGS. 2 and 3, respectively, depict block diagrams of the apparatus depicted in FIG. 1, in accordance with embodiments of the present disclosure.

Reference is first made to FIGS. 1 and 2. FIG. 1 shows a block diagram of a network environment 100, in which an apparatus 102 may determine whether a subject container image 112 includes an anomalous activity, in accordance with an embodiment of the present disclosure. FIG. 2 depicts a block diagram of the apparatus 102 depicted hi FIG. 1, in accordance with an embodiment of the present disclosure. It should be understood that the network environment 100 and/or the apparatus 102 may include additional features and that some of the features described herein may be removed and/or modified without departing from the scopes of the network environment 100 and/or the apparatus 102.

As shown in FIG. 1, the network environment 100 may include the apparatus 102, a plurality of registries 120a-120n (in which the variable "n" may denote a value greater than one), a network 130, an administrator 140, and a host device 150. The apparatus 102 may be a computing device such as a server, a laptop computer, a desktop computer, a tablet computer, and/or the like. In particular examples, the apparatus 102 is a server on the cloud. In some examples, functionalities of the apparatus 102 may be spread over multiple apparatuses 102, multiple virtual machines, and/or the like. The apparatus 102 may include a network interface 110 through which the apparatus 102 may communicate with components over the network 130, The network 130 may be an internal network, such as a local area network, an external network, such as the Internet, or a combination thereof.

As shown in FIGS. 1 and 2, the apparatus 102 may include a processor 104 that may control operations of the apparatus 102. Thus, for instance, references made herein to the apparatus 102 performing various operations should equivalently be construed as meaning that the processor 104 of the apparatus 102 may perform those various operations. The apparatus 102 may also include a memory 106 on which instructions that the processor 104 may access and/or may execute may be stored. In addition, the processor 104 may include a data store 108 on which the processor 104 may store and access various information as discussed herein. The processor 104 may be a semiconductor-based microprocessor, a central processing unit (CPU), an application specific integrated circuit (ASIC), a field-programmable gate array (FPGA), and/or other hardware device.

The memory 106 and the data store 108, which may also each be termed a computer readable medium, may each be, for example, a Random Access memory (RAM), an Electrically Erasable Programmable Read-Only Memory (EEPROM), a storage device, or the like. The memory 106 and/or the data store 108 may be a non-transitory computer readable storage medium, where the term "non-transitory" does not encompass transitory propagating signals. In any regard, the memory 106 may have stored thereon machine-readable instructions that the processor 104 may execute. The data store 108 may have stored thereon data that the processor 104 may enter or otherwise access.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

According to examples, the apparatus 102 may be in communication with the registries 120a-120n, which may also be termed image registries 120a-120n, via the network 130. Each of the registries 120a-120n may store respective sets of container images 122a-122n, in which the container images 122a-122n may be imported and executed on the host device 150. Generally speaking, each of the registries 120a-120n may be a data repository that allows programming and testing of container images 122a-122n. In addition, the registries 120a-120n may provide a centralized resource for discovery, management, distribution, collaboration, etc., of base container images. The registries 120a-120n may be hardware devices and/or software stored in hardware devices, such as data storage devices.

In some examples, various organizations may manage respective ones of the registries 120a-120n. For instance, a first organization may manage a first registry 120a, a second organization may manage a second registry 120b, and so forth. In many instances, the various organizations may use their own naming or addressing conventions for the container images 122a-122n stored in the registries 120a-120n. Thus, for instance, the first organization may upload container images 122a having a first naming convention to the first registry 120a and the second organization may upload container images 122b having a second naming convention to the second registry 120b. As a result, in some instances, the same container images may be stored in multiple registries, but may have different names with respect to each other. In addition, some container images may be the same as other container images but may have different tags, e.g., different version identifiers. In these instances, the container images may be stored in the same or in different registries 120a-120n. As result, a determination as to whether container images are the same or similar, e.g., run similar processes with respect to each other, may not readily be made simply from the identifiers assigned to the container images.

The container images 122a-122n may become containers during runtime. That is, the container images 122a-122n may be uploaded to the host device 150 from the registries 120a-120n and the host device 150 may run the container images 122a-122n. The host device 150 may be a physical machine, a virtual machine, a cloud infrastructure, and/or the like. The host device 150 may also be deployed in a data center, a cloud computing platform (e.g., a public cloud platform, a private cloud platform, or a hybrid cloud platform), on-premises, or in a combination thereof.

In some instances, a malicious actor may attempt to include malware or other malicious code in the container images 122a-122n. According to examples discussed herein, the processor 104 may perform operations to identify potentially malicious code in the container images 122a-122n in an efficient manner. Particularly, the processor 104 may infer a behavioral profile of a subject container image 112 from behavioral profiles 114 of groups of container image groups 116. Additionally, based on the inferred behavioral profile, the processor 104 may determine whether the subject container image 112 includes anomalous behavior. Moreover, based on a determination that the subject container image 112 includes anomalous behavior, the processor 104 may handle the subject container image 112 as including anomalous behavior. For instance, the processor 104 may output an alert such that the administrator 140 may be notified of the anomalous behavior and may make a determination as to whether the anomalous behavior is malicious or benign. These operations are discussed in greater detail herein.

According to examples, the processor 104 may access the container images 122a-122n stored in the registries 120a-120n, for instance, through the network 130. Particularly, the processor 104 may access the identifiers of the container images 122a-122n stored in the registries 120a-120n and may determine container image groups 116 as discussed in greater detail herein. The processor 104 may also determine behavioral profiles 114 of the container image groups 116. In addition, the processor 104 may store identifications of the behavioral profiles 114 and the container image groups 116 in the data store 108.

As shown in FIG. 2, the memory 106 may have stored thereon machine-readable instructions 200-206 that the processor 104 may execute. As shown, the processor 104 may execute the instructions 200 to identify a container image group of a plurality of container image groups 116 to which a subject container image 112 corresponds. According to examples, the processor 104 may determine the plurality of container image groups 116 such that, for instance, each of the container image groups 116 includes related sets of container images 122a-122n. The processor 104 may determine the plurality of container image groups 116. In other examples, a processor of another computing device may determine the plurality of container image groups 116.

Generally speaking, some or all of the container images 122a-122n stored in the registries 120a-120n may be clustered into the container image groups 116 through application of any suitable clustering technique. For instance, the container images 122a-122n may be clustered into the container image groups 116 through application of relation inference and clustering. As a particular example, the clustering of the container images 122a-122n into the container image groups 116 may be performed through graph representation and connected component analysis. An example of this technique is described in greater detail herein.

According to examples, a first container image 122a may be clustered into a container image group with, e.g., may be considered to be related to, a second container image 122b when the first container image 122a and the second container Image 122b have the same identifiers (or image identifiers). The identifiers may be addresses of the container images 122a-122n, which may include the names of the registries 120a-120n on which the container images 122a-122n are stored, names of the container images 122a-122n, versions or tags of the container images 122a-122n, hash (e.g., Secure Hash Algorithm (SHA) or digest) values of the contents of the container images 122a-122n, and/or the like.

According to examples, the first container image 122a may be considered to be related to a second container image 122b when the first container image 122a and the second container image 122b have matching identifiers, but have different versions and belong to a common repository. As a further example, the first container image 122a may be considered to be related to a second container image 122b when the first container image 122a and the second container image 122b are stored in different registries 120a, 120b and have matching digest values. In instances in which the first container image 122a and the second container image 122b have matching digest values, the first container image 122a and the second container image 122b may be determined as having the same binary content, even though they may have different identifiers.

As a further example, the first container image 122a may be considered to be related to a second container image 122b when the identifier of the first container image 122a contains a registry name and a repository name and the identifier of the second container image 122b includes the repository name of the identifier of the first container image 122a. As a yet further example, the first container image 122a may be considered to be related to a second container image 122b when the identifier of the first container image 122a includes a library and an Implicit repository prefix and the identifier of the second container image 122b includes the implicit repository prefix of the first container image 122a.

In some examples, the conditions for determining which of the container images 122a-122n are to be grouped together may be user-defined. For instance, a user may define a condition or rule that indicates that container images 122a, 122b having matching image identifiers, but having different versions may not be related to each other and thus, may not be clustered into the same container image group. Likewise, a user may specify that only container images 122a-122n having matching identifiers may be clustered into the same container image group.

Particular reference is made herein to the container images 122a-122n being clustered into groups based on the identifiers of the container images 122a-122an. In other examples, however, the clustering of the container images 122a-122n may be based on other factors. For instance, the container images 122a-122n may be clustered based on how the container images 122a-122n are being deployed, based on the configurations of the container images 122a-122n, based on the contexts in which the container images 122a-122n are being used, and/or the like. As an example, the container images 122a-122n that have the same or similar types of deployments may be clustered into common groups. As another example, the container images 122a-122n that have the same or similar contexts of use may be clustered into common groups. In these examples, the processor 104 may analyze the container images 122a-122n beyond the identifiers of the container images 122a-122n to cluster the container images 122a-122n into the container Image groups 116.

According to examples, some or all of the container images 122a-122n stored in the registries 120a-120n may be grouped into the plurality of container image groups 116 based on the relationships between the container images 122a-122n as discussed herein. In some examples, the relationships between the container images 122a-122n may originate from any of a number of sources of metadata and/or data. For instance, the relationships may be determined from any general source of information that may be black-box, white-box, or any-box-type analysis. By way of example, the processor 104 may access information regarding the container images 122a-122n from the data and/or metadata of the container images 122a-122n themselves and/or from the registries 120a-120n.

As used herein, the subject container image 112 may be a new container image or a container image that is newly seen by the processor 104. Particularly, for instance, the subject container image 112 may be a container image that has newly been uploaded and stored into one of the registries 120a-120n. As a result, the subject container image 112 may not have undergone a determination as to whether the subject container image 112 is related to any of the container images 122a-122n. Additionally, the subject container image 112 may not have undergone an analysis to determine whether the subject container image 112 includes an anomalous activity, which may potentially be malicious.

According to examples, the processor 104 may identify the container image group to which the subject container image 112 corresponds by determining whether the subject container image 112 is related to any of the other container images 122a-122n. The processor 104 may determine whether the subject container image 112 is related to any of the other container images 122a-122n based on the subject container image 112 meeting any of the above-described relationships. For instance, the processor 104 may determine whether the identifier of the subject container image 112 matches any of the identifiers of the other container images 122a-122n. In this example, the processor 104 may determine that the subject container image 112 is related to a container image 122a that has an identifier that matches the identifier, e.g., the address, of the subject container image 112. As another example, the processor 104 may determine that the subject container image 112 is related to a container image 122a that has the same digest, e.g., hash value, as the subject container image 112. In some instances, the processor 104 may determine that the subject container image 112 corresponds to multiple container images 122a, 122b that are in different container image groups.

As discussed herein, each of the plurality of container image groups 116 may be assigned a respective behavioral profile 114. That is, a first container image group may be assigned a first behavioral profile, a second container image group may be assigned a second behavioral profile, and so forth. In some examples, the behavioral profile 114 of a container image group 116 may correspond to, e.g., may be equivalent to, a behavioral profile of a container image in the container image group 116. The behavioral profile of the container image may include an identification of the applications that are executed during runtime, calls made by the applications, libraries accessed by the applications, processes executed by the applications, etc. The types of processes identified for a behavioral profile of a container image may be user-defined, based on historical analysis, etc. The types of processes included in the behavioral profile of a container image may also be updated over time.

The behavioral profiles 114 of the container image groups 116 may generally indicate the normal behaviors of the container images in the container image groups 116. In this regard, for instance, the behavioral profiles 114 of the container image groups 116 may indicate permissible operations and processes in the container images of the container image groups 116. As examples, the behavioral profiles 114 may indicate system calls allowed to be made, permissible network actions, permissible filesystem actions, signatures of executable files of spawned processes, a combination thereof, and/or the like.

The processor 104 may execute the instructions 202 to determine whether activities in the subject container image 112 comply with corresponding activities identified in the behavioral profile 114 of the identified container image group 116. Particularly, for instance, the processor 104 may determine whether the activities in the subject container image 112 violate any of the permissible actions identified in the behavioral profile 114 of the identified container image group 116.

The processor 104 may execute the instructions 204 to, based on a determination that at least one activity in the subject container image 112 fails to comply with a corresponding at least one activity identified in the behavioral profile of the identified container image group, determine that the subject container image includes an anomalous activity. By way of particular example, the processor 104 may determine that at least one activity in the subject container image 112 fails to comply with a corresponding at least one activity identified in the behavioral profile of the identified container image group 116 when an application hi the subject container image 112 makes a system call that is identified as being impermissible hi the behavioral profile.

In one regard, therefore, the processor 104 may infer a normal behavioral profile for the subject container image 112 from the relationship that the subject container image 112 has with the container images in a corresponding container image group 116. As a result, the processor 104 may not need to perform additional operations that may require additional processing operations and energy consumption to determine whether the subject container image 112 complies with a normal behavioral profile of the subject container image 112, The processor 104 may thus determine whether the subject container image 112 includes anomalous behavior without having to analyze the runtime behavior of the subject container image 112.

In addition, the processor 104 may execute the instructions 204 to, based on a determination that the at least one activity in the subject container image 112 fails to comply with a corresponding at least one activity identified in the behavioral profile of the identified container image group, output an alert indicating that the subject container image 112 includes an anomalous activity. For instance, the processor 104 may output an alert to an administrator 140 to inform them of the anomalous activity in the subject container image 112. The alert may be a communication provided through a portal, an email message, a text message, and/or the like. The administrator 140 may perform further analysis on the subject container image 112 to determine whether the anomalous activity is potentially malicious and may take further actions based on that determination. For instance, the administrator 140 may block the subject container image 112 from being executed, may quarantine the subject container image 112, may cause the subject container image 112 to be run in a closed sandbox environment, and/or the like.

In some examples, hi addition to or hi place of outputting the alert, the processor 104 may block the subject container image 112 from being executed, may quarantine the subject container image 112, may cause the subject container image 112 to be run in a closed sandbox environment, and/or the like.

In some instances, the processor 104 may determine that the subject container image 112 does not correspond to any of the container image groups 116. In these instances, the processor 104 may determine a behavioral profile of the subject container image 112 itself. Particularly, the processor 104 may cause the host device 150 to run the subject container image 112 and the processor 104 may determine the processes executed in the running of the subject container image 112. The processor 104 may determine the behavioral profile of the subject container image 112 based on the executed processes. In addition, the processor 104 may create a new container image group including the subject container image 112. The processor 104 may also determine whether subject container image 112 includes anomalous behavior through implementation of other actions.

Figure 3:
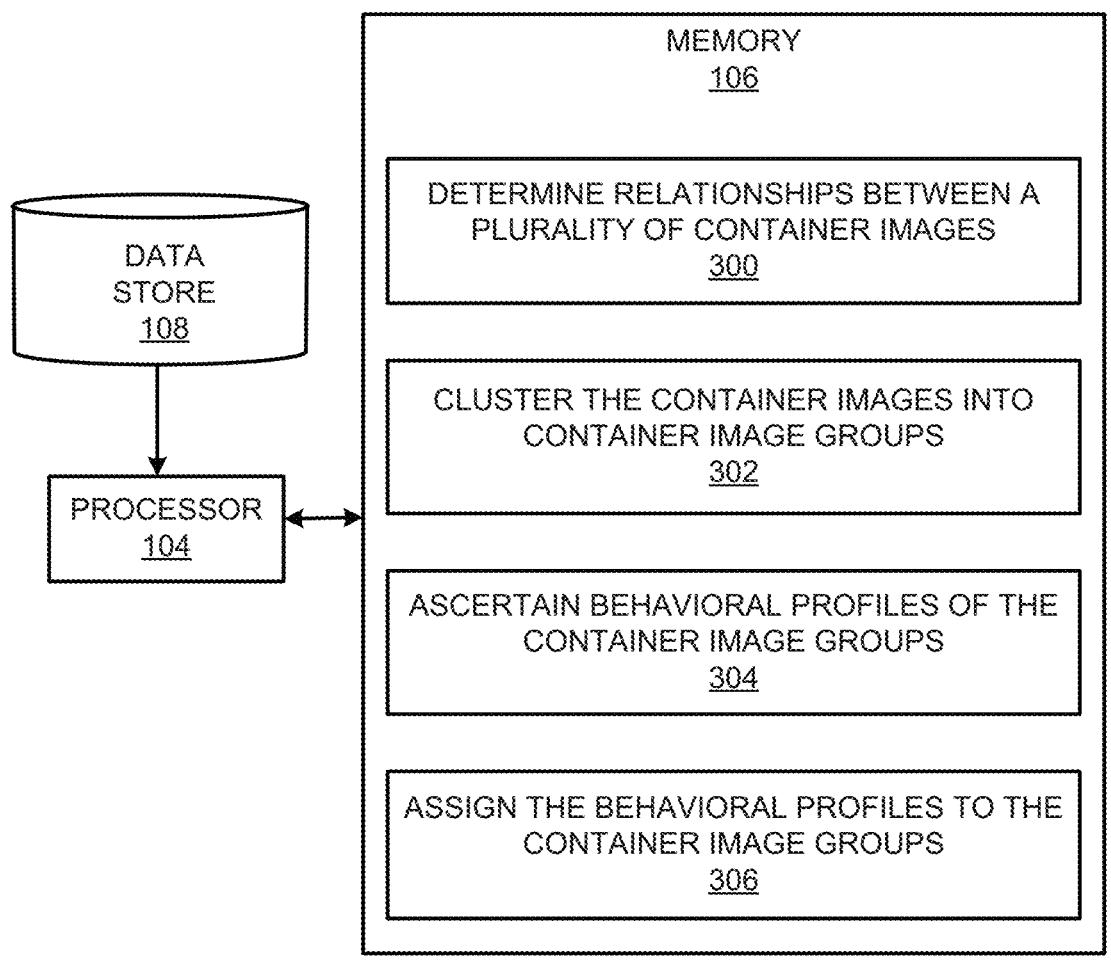

As shown in FIG. 3, the memory 106 may have stored thereon machine-readable instructions 300-306 that the processor 104 may execute. According to examples, the processor 104 may execute the instructions 300-306 prior to, in conjunction with, or after execution of the instructions 200-206 discussed above with respect to FIG. 2. In other examples, the processor 104 may execute the instructions 300-306 as a completely separate set of instructions from the Instructions 200-206.

As shown, the processor 104 may execute the instructions 300 to determine relationships between a plurality of container images 122a-122n, The processor 104 may determine the relationships between the plurality of container images 122a-122n in any of the manners discussed herein. For instance, the processor 104 may determine the relationships based on the identifiers of the container images 122a-122n, based on configurations of the container images 122a-122n, based on contexts in which the container images 122a-122n, and/or the like.

The processor 104 may execute the instructions 302 to cluster the container images 122a-122n into the plurality of container image groups 116 based on the determined relationships. Particularly, for instance, the processor 104 may cluster related container images 122a-122n together into the container image groups 116. This may include clustering some of the container images 122a-122n into one or more of the container image groups 116.

The processor 104 may execute the instructions 304 to ascertain, for each of the plurality of container image groups 116, the behavioral profile 114 of the container image group 116. According to examples, the processor 104 may ascertain the behavioral profile of a container image in the container image group 116 in order to ascertain the behavioral profile 114 of the container image group 116. The processor 104 may select one of the container images based on a user-defined policy, such as, the newest container image in the container image group 116, the oldest container image in the container image group 116, etc. Alternatively, the processor 104 may select the container image at random. In some examples, the processor 104 may ascertain the behavioral profiles of a number of the container images in the container image group 116 and may develop a behavioral profile of the container image group 116 from the behavioral profiles. For instance, the processor 104 may determine that the behavioral profile of the container image group 116 may include activities that are included in a first container image but not included in a second container image of the container image group 116. As another example, the processor 104 may determine that the behavioral profile of the container image group 116 may include only those activities that are included in each of the behavioral profiles of the first and second container images.

In any of the examples above, the behavioral profile of a container image may include an identification of the applications that are executed during runtime, calls made by the applications, libraries accessed by the applications, processes executed by the applications, etc. The types of processes identified for a behavioral profile of a container image may be user-defined, based on historical analysis, etc.

The types of processes included in the behavioral profile of a container image may also be updated over time.

The processor 104 may execute the instructions 306 to assign, for each of the plurality of container image groups 116, the ascertained behavioral profile of the container image group to the container image group. The processor 104 may store an indication of the container image groups 116, e.g., the identifications of the container images clustered into each of the container image groups 116, and identifications of the container image groups 116. For instance, the processor 104 may assign identifications to each of the container image groups 116 and may store the assigned identifications in the data store 108. In addition, the processor 104 may store the assignments of the behavioral profiles to the container image groups 116 in the data store 108.

Figure 4:
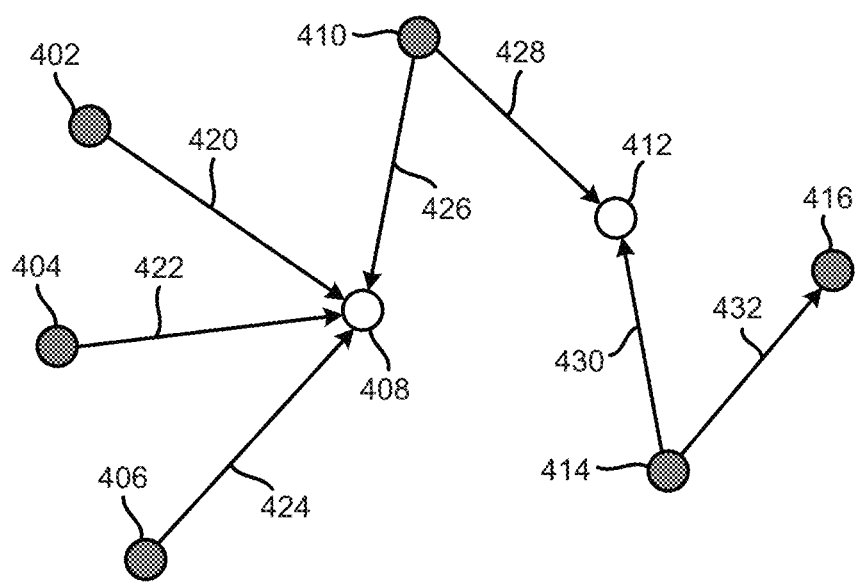
FIG. 4 depicts a graphical representation of the relationships between a plurality of container images depicted in FIG. 1, in accordance with an embodiment of the present disclosure.

According to examples, the processor 104 may employ a graphical representation technique to determine the relationships between the plurality of container images 122a-122n. FIG. 4 depicts a graphical representation 400 of the relationships between a plurality of container images 122a-122n, in accordance with an embodiment of the present disclosure. It should be clearly understood that the features shown in FIG. 4 are for illustrative purposes only and are thus not intended to limit the scope of the present disclosure, Additionally, it should be understood that the graphical representation 400 may represent a relatively small portion of a larger graphical representation and thus, the graphical representation 400 may include a larger number of nodes and edges than are shown in FIG. 4.

In the graphical representation (or graph) 400, each of the nodes 402-416 may represent a respective container image 122a-122n. In addition, each of the edges 420-432 may represent a relationship between the container images 122a-122n, That is, an edge 420 provided between two nodes 402, 408 may indicate that the container images 122a-122n represented by the nodes 402, 408 may be related to each other as discussed herein. According to examples, the processor 104 may, build the graph 400 of relationships between the container images 122a-122n based on features of the container images 122a-122n, For instance, the processor 104 may access a first container image from a first registry 120a and may graphically represent the first container image as a first node 402. The processor 104 may access a second container image from the first registry 120a and may graphically represent the second container image as a second node 404.

The processor 104 may also determine whether the second container image is related to the first container image. The processor 104 may determine whether the second container image is related to the first container image 122a-1 in any of the manners discussed herein, e.g., based on the identifiers of the container Images, based on the contexts of the container images, etc. According to examples, the processor 104 may include an edge between a first node 402 and a second node 404 when the first node 402 and the second node 404 have matching image identifiers: the first node 402 and the second node 404 have matching image identifiers, but have different versions and belong to a common repository; the first node 402 and the second node 404 belong to different repositories and have matching digest values; the first node 402 includes an image identifier that contains a registry and a repository and the second node 404 includes an image identifiers that contains the repository of the first node; the first node 402 includes an image identifier that contains a library and an implicit repository prefix and the second node 404 includes an image identifier that includes the implicit repository prefix of the first node, and/or the like.

Based on a determination that the second container image is related to the first container image, the processor 104 may build an edge between the first node 402 and the second node 404. However, based on a determination that the second container image is not related to the first container image, the processor 104 may not build an edge between the first node 402 and the second node 404. The processor 104 may continue to add the remaining nodes 406-416 into the graph 400 and may continue to build the edges 420-432 between the nodes 402-416 corresponding to related container images 122a-122n. In some examples, the processor 104 may re-position some of the nodes 402-416 such that the nodes 402-416 that have edges between them are located in closer proximities to each other.

In some examples, the processor 104 may compute connected components based on the graph 400 of relationships. That is, the processor 104 may compute which of the nodes 402-416 are connected to each other by the edges 420-432. In addition, the processor 104 may determine that multiple nodes 402-416 belong to the same connected component (e.g., container image group 116) when there exists an edge 420-432 between the nodes. The processor 104 may cluster the container images 122a-122n into the container image groups 116 using the computed connected components. In some instances, the container image groups 116 may represent respective multiple versions of common container images. That is, a first container image group may represent multiple versions of a first set of common container images, a second container group may represent multiple versions of a second set of common container images, and so forth.

By way of particular example, a container image group may include container images having the same hash (e.g., SHA) of the contents of the container images. As another example, a container image group may include container Images that have identifiers that include the same registry and name, but different versions. For instance, a first container image (node 402) having the address "docker.io/library/nginx:1.15.5" may be clustered into the same container image group as a second container image (node 404) having the address "docker.io/library/nginx:1.17.0." A third container image (node 410) having the address "/library/nginx@sha256:e7f0 . . . " may also be clustered into that container image group. The third container image (node 410) may also be clustered into another container image group that includes container images (node 412) having the "sha256:e7f0 . . . " in their addresses.

According to examples, the processor 104 may determine weights associated with the edges 420-432, in which the weights may denote the strengths of relationships between the nodes 402-416 to which the edges 420-432 are connected. For instance, the processor 104 may assign a higher weight to the edges that correspond to a relatively stronger relationship and a lower weight to the edges that correspond to a relatively weaker relationship, By way of example, edges connecting nodes that represent container images having the same version/tags may be assigned higher weights. In addition, edges connecting nodes that represent container images having different versions/tags may be assigned lower weights, hi other words, the weights assigned to the edges may correspond to the similarities of the nodes to which the edges are connected.

In some examples, the processor 104 may cluster the container images 122a-122n according to the weights assigned to the edges 420-432 between the nodes corresponding to the container images 122a-122n. For instance, the processor 104 may include the container images 122a-122n that are connected by edges having at least a predefined weight, e.g., 0.5, 1, or the like, into a container image group. The threshold weight value may be user-defined, based on historical data, and/or the like.

Although the instructions 200-206 and 300-306 are described herein as being stored on the memory 106 and may thus include a set of machine-readable instructions, the apparatus 102 may include hardware logic blocks that may perform functions similar to the instructions 200-206 and 300-306. For instance, the processor 104 may include hardware components that may execute the instructions 200-206 and 300-306. In other examples, the apparatus 102 may include a combination of instructions and hardware logic blocks to implement or execute functions corresponding to the instructions 200-206 and 300-306. In any of these examples, the processor 104 may implement the hardware logic blocks and/or execute the instructions 200-206 and 300-306. As discussed herein, the apparatus 102 may include additional instructions and/or hardware logic blocks such that the processor 104 may execute operations in addition to or in place of those discussed above with respect to FIGS. 2 and/or 3.

Figure 5:
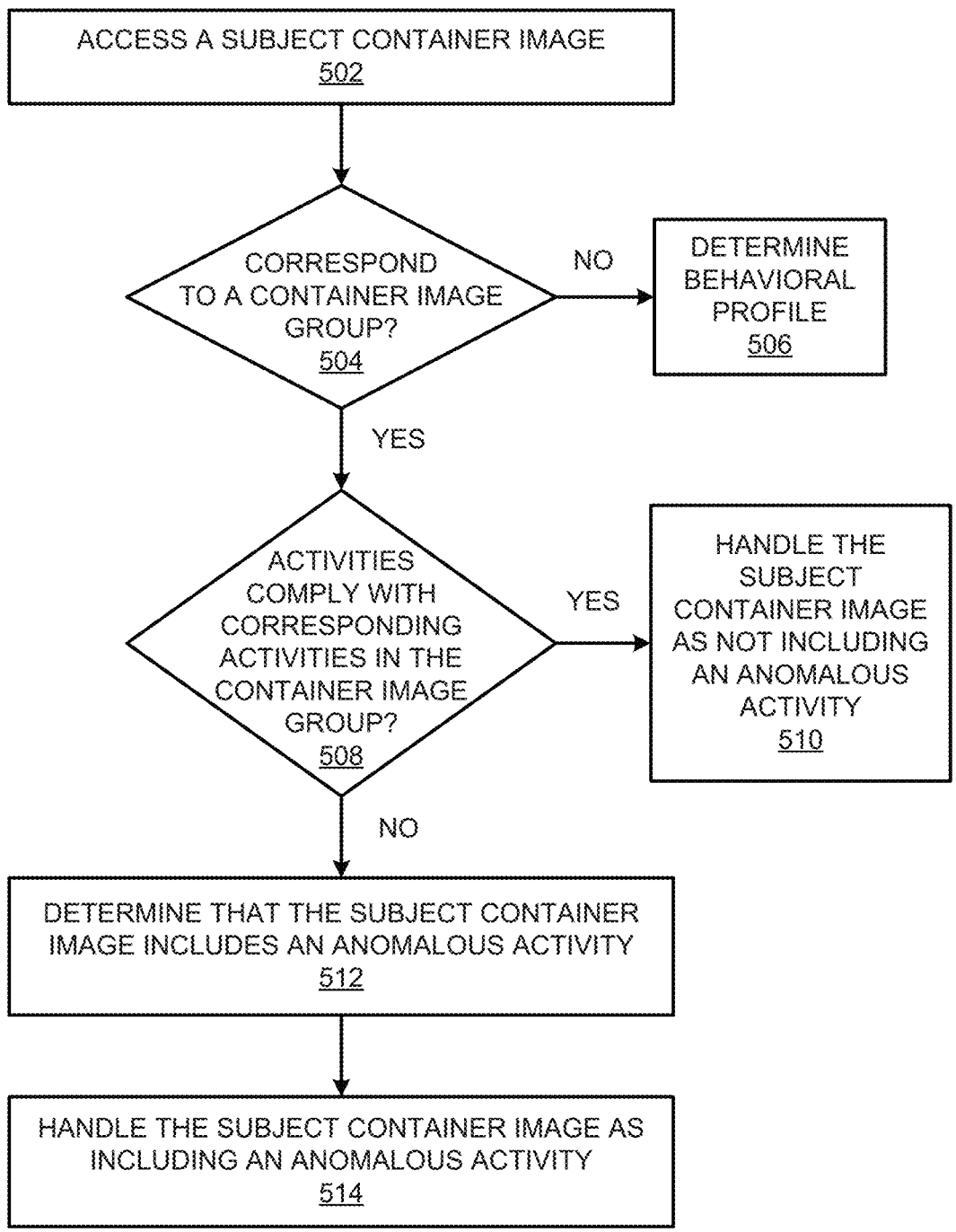
FIG. 5 depicts a flow diagram of a method for determining whether a subject container image is to be handled as including an anomalous activity based on an inference of a behavioral profile assigned to a container image group to which the subject container image corresponds, in accordance with an embodiment of the present disclosure.
Figure 6:
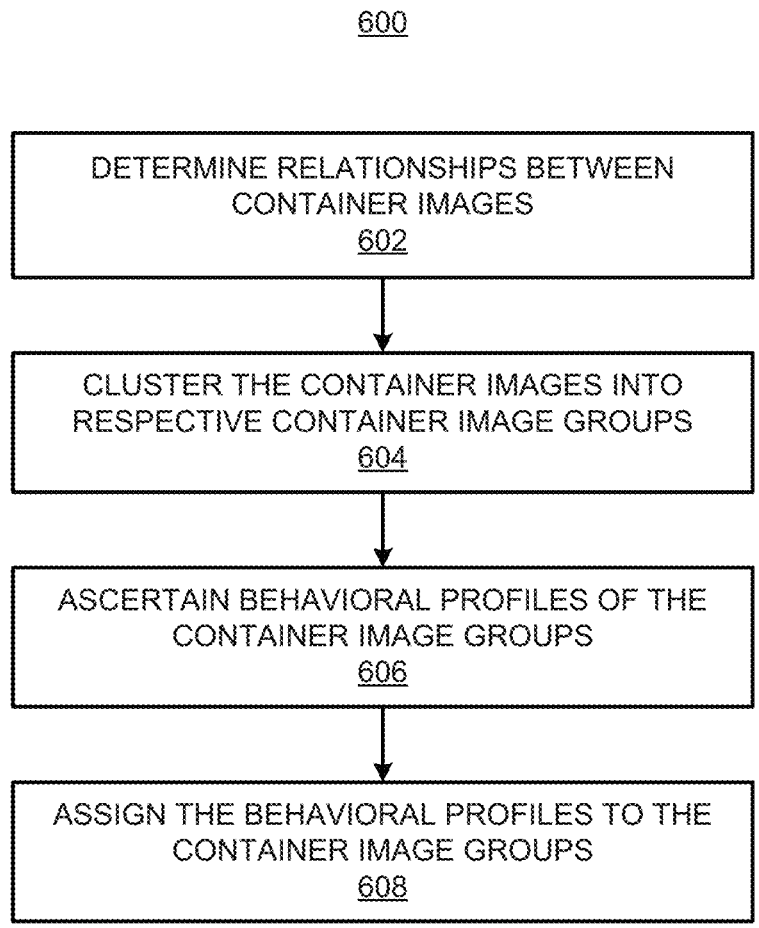
FIG. 6 depicts a flow diagram of a method for clustering container images into container image groups, in accordance with an embodiment of the present disclosure.

Various manners in which the processor 104 of the apparatus 102 may operate are discussed in greater detail with respect to the methods 500 and 600 depicted in FIGS. 5 and 6. Particularly, FIG. 5 depicts a flow diagram of a method 500 for determining whether a subject container image 112 is to be handled as including an anomalous activity based on an inference of a behavioral profile 114 assigned to a container image group 116 to which the subject container image 112 corresponds, in accordance with an embodiment of the present disclosure, FIG. 6 depicts a flow diagram of a method 600 for clustering container images 122a-122n into container image groups 116, in accordance with an embodiment of the present disclosure. It should be understood that the methods 500 and 600 may include additional operations and that some of the operations described therein may be removed and/or modified without departing from the scopes of the methods 500 and 600. The descriptions of the methods 500 and 600 are made with reference to the features depicted in FIGS. 1-4 for purposes of illustration.

With reference first to FIG. 5, at block 502, the processor 104 may access a subject container image 112. For instance, the processor 104 may access the subject container image 112 from one of the registries 120a-120n, in which the subject container image 112 may be new container image or a container image that is newly seen by the processor 104. In other examples, the processor 104 may access the subject container image 112 in other manners. For instance, the processor 104 may access the subject container image 112 prior to the subject container image 112 being stored onto one of the registries 120a-120n.

At block 504, the processor 104 may determine whether the subject container image 112 corresponds to a container image group of a plurality of container image groups 116. As discussed herein, the processor 104 may determine whether the subject container image 112 corresponds to any of the container image groups 116 based on whether the subject container image 112 is related to any of the container images in the container image groups 116. As also discussed herein, each of the container image groups 116 may be assigned a respective behavioral profile 114.

Based on a determination that the subject container image 112 does not correspond to any of the container image groups 116, at block 506, the processor 104 may determine a behavioral profile of the subject container image 112. The processor 104 may also or alternatively, cause the subject container image 112 to be analyzed to determine whether the subject container image 112 includes an anomalous behavior and may therefore potentially be malicious. This may entail a more in-depth review of the processes included in the subject container image 112.

However, based on a determination that the subject container image 112 corresponds to a container image group of the plurality of container image groups 116, at block 508, the processor 104 may determine whether activities in the subject container image 112 comply with corresponding activities identified in the behavioral profile 114 of the corresponding container image group 116. For instance, the processor 104 may determine whether the activities in the subject container image 112 violate any of the permissible activities identified in the behavioral profile 114 of the corresponding container image group 116.

Based on a determination that the activities in the subject container image 112 comply with the corresponding activities identified in the behavioral profile 114 of the corresponding container image group 116, at block 510, the processor 104 may handing the subject container image 112 as not including an anomalous activity. Thus, for instance, the processor 104 may permit the subject container image 112 to be stored in a registry 120a, may permit users to use the subject container image 112, and/or the like.

However, based on a determination that at least one activity in the subject container image 112 fails to comply with a corresponding at least one activity identified in the behavioral profile 114 of the identified container image group 116, at block 512, the processor 104 may determine that the subject container image 112 includes an anomalous activity. In addition, at block 514, the processor 104 may handle the subject container image 112 as including an anomalous activity. This handling may include the outputting of an alert to an administrator 140, the blocking of users from using the subject container image 112, the causing of further analysis being performed on the subject container image 112, and/or the like.

Reference is now made to FIG. 6. At block 602, the processor 104 may determine relationships between a plurality of container images 122a-122n. As discussed herein, the processor 104 may determine the relationships through any of a number of various techniques. For instance, the processor 104 may determine the relationships through building of a graphical representation 400 of the relationships and performing a connected component analysis on the graphical representation 400.

At block 604, the processor 104 may cluster the container images 122a-122n into the plurality of container image groups 116 according to the determined relationships. That is, the processor 104 may duster the container images 122a-122n that are related to each other into common container image groups 116.

At block 606, the processor 104 may ascertain, for each of the plurality of container image groups 116, the behavioral profile of the container image group. The behavioral profile of a container image group may include an identification of the applications that are executed during runtime, calls made by the applications, libraries accessed by the applications, processes executed by the applications, etc., of one or more of the container images in the container image group. Additionally, the behavioral profiles 114 of the container image groups 116 may generally indicate the normal behaviors of the container images in the container image groups 116. In this regard, for instance, the behavioral profiles 114 of the container image groups 116 may indicate permissible operations and processes in the container images of the container image groups 116.

At block 608, the processor 104 may assign, for each of the plurality of container image groups 116, the ascertained behavioral profile 114 of the container image group to the container image group. The processor 104 may also store the assignments of the behavioral profiles 114 to the container image groups 116 in the data store 108.

Some or all of the operations set forth in the methods 500 and 600 may be included as utilities, programs, or subprograms, in any desired computer accessible medium. In addition, the methods 500 and 600 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
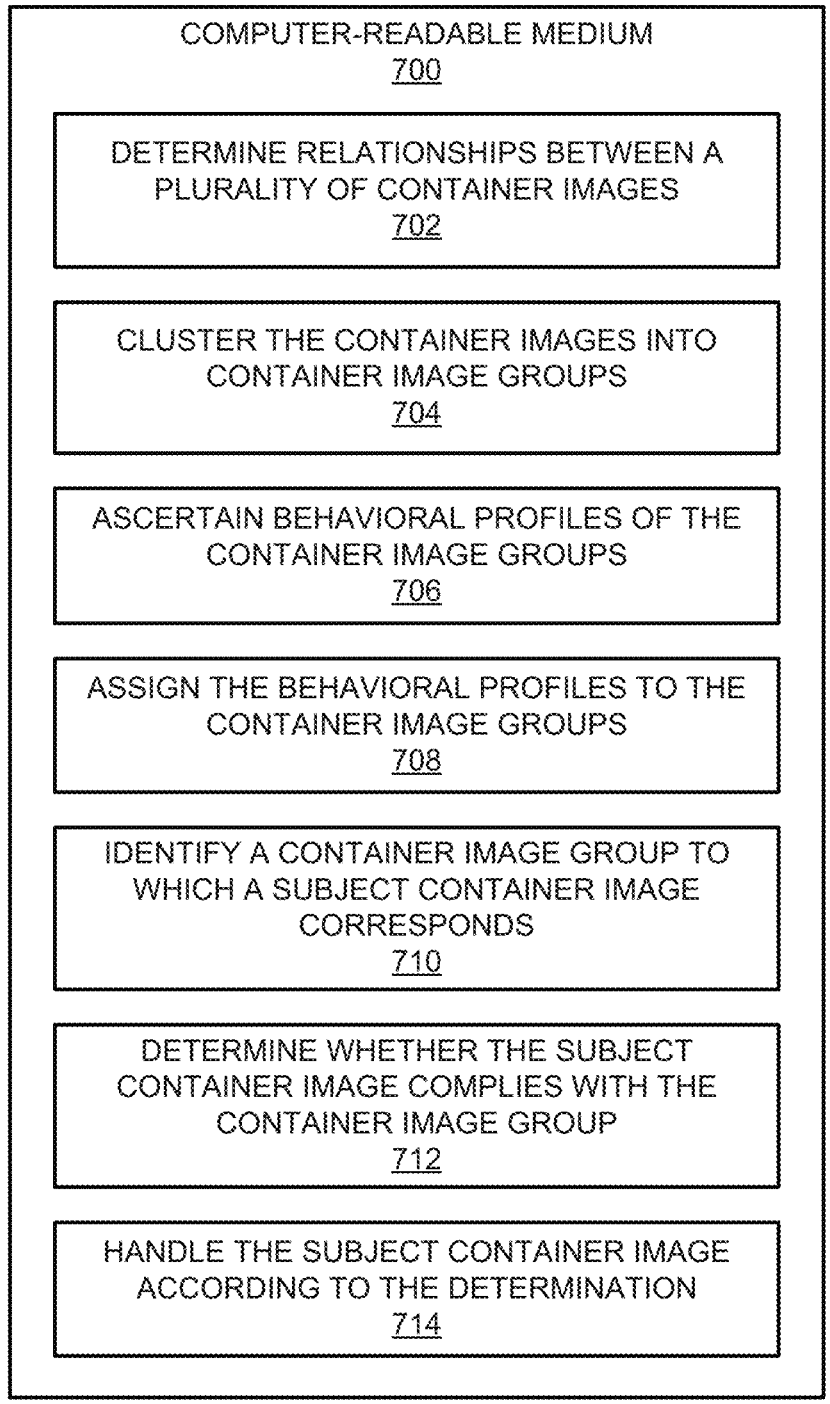
FIG. 7 shows a block diagram of a computer-readable medium that may have stored thereon computer-readable instructions for clustering container images into container image groups and for determining whether a subject container image is to be handled as including an anomalous activity based on an inference of a behavioral profile assigned to a container image group to which the subject container image corresponds, in accordance with an embodiment of the present disclosure.

Turning now to FIG. 7, there is shown a block diagram of a computer-readable medium 700 that may have stored thereon computer-readable instructions for clustering container images 122a-122n into container image groups 116 and for determining whether a subject container image 112 is to be handled as including an anomalous activity based on an inference of a behavioral profile 114 assigned to a container image group 116 to which the subject container image 112 corresponds, in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The computer-readable medium 700 may be a non-transitory computer-readable medium, in which the term "non-transitory" does not encompass transitory propagating signals.

The computer-readable medium 700 may have stored thereon computer-readable instructions 702-714 that a processor, such as the processor 104 of the apparatus 102 depicted in FIGS. 1-4, may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to determine relationships between a plurality of container images 122a-122n, The processor may fetch, decode, and execute the instructions 704 to cluster the container images 122a-122n into a plurality of container image groups based on the determined relationships. The processor may fetch, decode, and execute the instructions 706 to ascertain, for each of the plurality of container image groups 116, a behavioral profile 114 of the container image group. The processor may fetch, decode, and execute the instructions 708 to assign, for each of the plurality of container image groups 116, the ascertained behavioral profile 114 of the container image group to the container image group.

The processor may fetch, decode, and execute the instructions 710 to identify a container image group of the plurality of container image groups 116 to which a subject container image 112 corresponds, in which each of the plurality of container image groups 116 is assigned a respective behavioral profile 114. The processor may fetch, decode, and execute the instructions 712 to determine whether activities in the subject container image 112 comply with corresponding activities identified in the behavioral profile 114 of the identified container image group 116. In addition, the processor may fetch, decode, and execute the instructions 714 to handle the subject container image 112 according to the determination as to whether the activities hi the subject container image 112 comply with the corresponding activities. Particularly, based on a determination that at least one activity hi the subject container image fails to comply with a corresponding at least one activity identified in the behavioral profile of the identified container image group, the processor may determine that the subject container image includes an anomalous activity and may handle the subject container image 112 as including an anomalous activity. However; based on a determination that the activities in the subject container image comply with the behavioral profile of the identified container image group, the processor may handle the subject container image 112 as not including an anomalous activity.

According to examples, the processor may build a graph 400 (FIG. 4) of relationships between the plurality of container images 122a-122n; in which the graph 400 may include: nodes 402-416 that represent image identifiers of the container images and edges 420-432 that represent the relationships of the container images 122a-122n with respect to other container images. The processor may also compute connected components based on the graph 400 of relationships to cluster the container images into the plurality of container image groups 116, in which each of the plurality of container image groups may represent respective multiple versions of a common container image.

According to examples, the processor may build the graph 400 to include an edge 420-432 between a first node 402 and a second node 404 when: the first node 402 and the second node 404 have matching image identifiers; the first node 402 and the second node 404 have matching image identifiers, but have different versions and belong to a common repository; the first node 402 and the second node 404 have matching digest values across registries; the first node 402 includes an image identifier that contains a registry and a repository and the second node 404 includes an image identifier that contains the repository of the first node 402; and/or the first node 402 includes an image identifier that contains a library and an implicit repository prefix and the second node 404 includes an image identifier that includes the implicit repository prefix of the first node 402.

Although described specifically throughout the entirety of the instant disclosure, representative examples of the present disclosure have utility over a wide range of applications, and the above discussion is not intended and should not be construed to be limiting; but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclo-

What is claimed is:

1. An apparatus comprising:
a processor; and
a memory on which is stored machine-readable instructions that when executed by the processor, cause the processor to:
build a graph of relationships between container images, wherein the graph includes nodes representing the container images and edges connecting the nodes to indicate the relationships between the container images;
assign weights to the edges corresponding to strengths of the relationships between the container images;
cluster the container images into container image groups based on the edges connecting the container images and the weights assigned to the edges, including grouping the container images that are connected by the edges having weights greater than a threshold value into a same container image group;
identify a certain container image group of the container image groups to which a subject container image corresponds, wherein the certain container image group is a cluster of container images, and is assigned a behavioral profile that identifies activities operated by applications of the container images in the certain container image group; and
determine whether the subject container image includes an anomalous activity based on whether activities in the subject container image comply with the activities identified in the behavioral profile of the certain container image group.

2. The apparatus of claim 1, wherein the instructions cause the processor to:
ascertain, for each of the container image groups, a behavioral profile of the container image group; and
assign, for each of the container image groups, the ascertained behavioral profile of the container image group to the container image group.

3. The apparatus of claim 1, wherein the instructions cause the processor to:
based on a determination that at least one of the activities in the subject container image fails to comply with the activities identified in the behavioral profile of the certain container image group, determine that the subject container image includes an anomalous activity.

4. The apparatus of claim 3, wherein, upon determining that the subject container image includes the anomalous activity, the instructions cause the processor to:
generate an alert indicating that the subject container image includes the anomalous activity.

5. The apparatus of claim 1, wherein the container images include image identifiers, and the image identifiers of the container images comprise, for each of the container images, a registry, a repository, and a tag assigned to the container image.

6. The apparatus of claim 1, wherein the instructions cause the processor to:
build the graph to include an edge between a first node and a second node in response to one of following conditions:
the first node and the second node have matching image identifiers;
the first node and the second node have matching image identifiers, but have different versions and belong to a common repository;
the first node and the second node belong to different repositories and have matching digest values;
the first node includes an image identifier that contains a repository and the second node includes an image identifier that contains the repository of the first node; or
the first node includes an image identifier that contains an implicit repository prefix and the second node includes an image identifier that includes the implicit repository prefix of the first node.

7. The apparatus of claim 1, wherein, to assign the weights to the edges, the instructions cause the processor to:
assign a higher weight to edges connecting nodes corresponding to container images that have same versions than to edges connecting nodes corresponding to container images that have different versions.

8. The apparatus of claim 1, wherein the instructions cause the processor to:
based on a determination that the subject container image does not correspond to any of the container image groups, determine a behavioral profile of the subject container image.

9. The apparatus of claim 1, wherein the subject container image comprises a container image that is new or newly seen by the processor.

10. A method comprising:
building, by a processor, a graph of relationships between container images, wherein the graph includes nodes representing the container images and edges connecting the nodes to indicate the relationships between the container images;
assigning, by the processor, weights to the edges corresponding to strengths of the relationships between the container images;
clustering, by the processor, the container images into container image groups based on the edges connecting the container images and the weights assigned to the edges, including grouping the container images that are connected by the edges having the weights greater than a threshold value into a same container image group;
determining, by the processor, whether a subject container image corresponds to one of the container image groups, wherein each of the container image groups is assigned a behavioral profile; and
based on a determination that the subject container image corresponds to a certain container image group of the container image groups, determining, by the processor, whether the subject container image includes an anomalous activity based on whether activities in the subject container image comply with activities identified in the behavioral profile of the certain container image group.

11. The method of claim 10, further comprising:
based on a determination that at least one of the activities in the subject container image fails to comply with the activities identified in the behavioral profile of the certain container image group, determining that the subject container image includes an anomalous activity.

12. The method of claim 11, further comprising:
generating an alert indicating that the subject container image includes the anomalous activity.

13. The method of claim 11, further comprising:
based on a determination that the subject container image includes the anomalous activity, blocking the subject container image from being executed.

14. The method of claim 10, further comprising:
building the graph to include an edge between a first node and a second node in response to one of following conditions:
- the first node and the second node have matching image identifiers;
- the first node and the second node have matching image identifiers, but have different versions and belong to a common repository;
- the first node and the second node have matching digest values across registries;
- the first node includes an image identifier that contains a repository and the second node includes an image identifier that contains the repository of the first node; or
- the first node includes an image identifier that contains an implicit repository prefix and the second node includes an image identifier that includes the implicit repository prefix of the first node.

15. The method of claim 10, wherein assigning the weights to the edges includes:
assigning higher weights to edges connecting nodes corresponding to container images that have same versions than to edges connecting nodes corresponding to container images that have different versions.

16. The method of claim 10, further comprising:
based on a determination that the subject container image does not correspond to any of the container image groups, determining a behavioral profile of the subject container image.

17. A computer-readable storage medium on which is stored computer-readable instructions that when executed by a processor, cause the processor to:
determine relationships between container images;
build a graph of the relationships between the container images, wherein the graph includes nodes representing the container images and edges connecting the nodes to indicate the relationships between the container images;
assign weights to the edges corresponding to strengths of the relationships between the container images;
cluster the container images into container image groups based on the edges connecting the container images and the weights assigned to the edges, including grouping the container images that are connected by the edges having weights greater than a threshold value into a same container image group;
determine whether a subject container image corresponds to any of the container image groups, wherein each of the container image groups is assigned a behavioral profile; and
based on a determination that the subject container image corresponds to a certain container image group of the container image groups, determine whether the subject container image includes an anomalous activity based on whether activities in the subject container image comply with activities identified in the behavioral profile of the certain container image group.

18. The computer-readable storage medium of claim 17, wherein the instructions further cause the processor to:
based on a determination that at least one of the activities in the subject container image fails to comply with the activities identified in the behavioral profile of the certain container image group,
determine that the subject container image includes an anomalous activity; and
handle the subject container image as including the anomalous activity.

19. The computer-readable storage medium of claim 17, wherein, to handle the subject container image as including the anomalous activity, the instructions further cause the processor to:
generate an alert indicating that the subject container image includes the anomalous activity.

20. The computer-readable storage medium of claim 17, wherein the instructions further cause the processor to:
build the graph to include an edge between a first node and a second node in response to one of following conditions:
- the first node and the second node have matching image identifiers;
- the first node and the second node have matching image identifiers, but have different versions and belong to a common repository;
- the first node and the second node have matching digest values across registries;
- the first node includes an image identifier that contains a repository and the second node includes an image identifier that contains the repository of the first node; or
- the first node includes an image identifier that contains an implicit repository prefix and the second node includes an image identifier that includes the implicit repository prefix of the first node.

* * * * *